United States Patent [19]

Hino et al.

[11] Patent Number: 4,858,012
[45] Date of Patent: Aug. 15, 1989

[54] CAMERA HAVING AUTOMATICALLY CONTROLLABLE SHOOTING FEATURES

[76] Inventors: Hiromasa Hino; Ikuo Fujimura, both c/o Fuji Photo Film Co., Ltd., 26-30, Nishi-Azabu 2-chome, Minato-ku, Tokyo, Japan

[21] Appl. No.: 170,362

[22] Filed: Mar. 18, 1988

[30] Foreign Application Priority Data

Mar. 19, 1987 [JP] Japan ................... 62-62389
Mar. 19, 1987 [JP] Japan ................... 62-62390

[51] Int. Cl.⁴ .................................. H04N 3/14
[52] U.S. Cl. ............................. 358/210; 358/906; 360/14.1
[58] Field of Search ........... 358/209, 210, 335, 78 C, 358/231.13, 906; 354/106

[56] References Cited

U.S. PATENT DOCUMENTS

| | | | |
|---|---|---|---|
| 4,314,278 | 2/1982 | Smith | 358/210 |
| 4,550,343 | 10/1985 | Nakatani | 358/209 |
| 4,558,935 | 12/1985 | Ishizaka et al. | 352/78 C |
| 4,574,319 | 4/1986 | Konishi | 358/335 |
| 4,589,023 | 3/1986 | Suzuki et al. | 358/213.13 |
| 4,631,590 | 12/1986 | Yamada et al. | 358/335 |
| 4,695,905 | 9/1987 | Utsugi | 358/906 |
| 4,728,978 | 3/1988 | Inoue et al. | 354/106 |
| 4,750,041 | 6/1988 | Vogel et al. | 358/213.13 |

FOREIGN PATENT DOCUMENTS 0203783 3/1986 European Pat. Off. ............ 358/906

Primary Examiner—Jin F. Ng
Assistant Examiner—Mehdi Haghani
Attorney, Agent, or Firm—Birch, Stewart, Kolasch & Birch

[57] ABSTRACT

There is connected to a video camera having automatically controllable shooting features a memory unit in which a program for setting those features is stored. A control circuit in the camera reads out the program from the memory unit upon actuation of a program button. The control circuit is responsive to actuation of the shooting start/stop button to control the shooting features under the conditions and sequence prescribed by the program. The shooting sequence proceeds in response to each actuation of the shooting start/stop button. Upon actuation of a program skip button or a pause program button, the shooting feature to be performed next in the program may be skipped or reserved. In this manner, the operator may learn or make an effective use of the shooting features of the camera merely by actuating the shooting start/stop button.

2 Claims, 13 Drawing Sheets

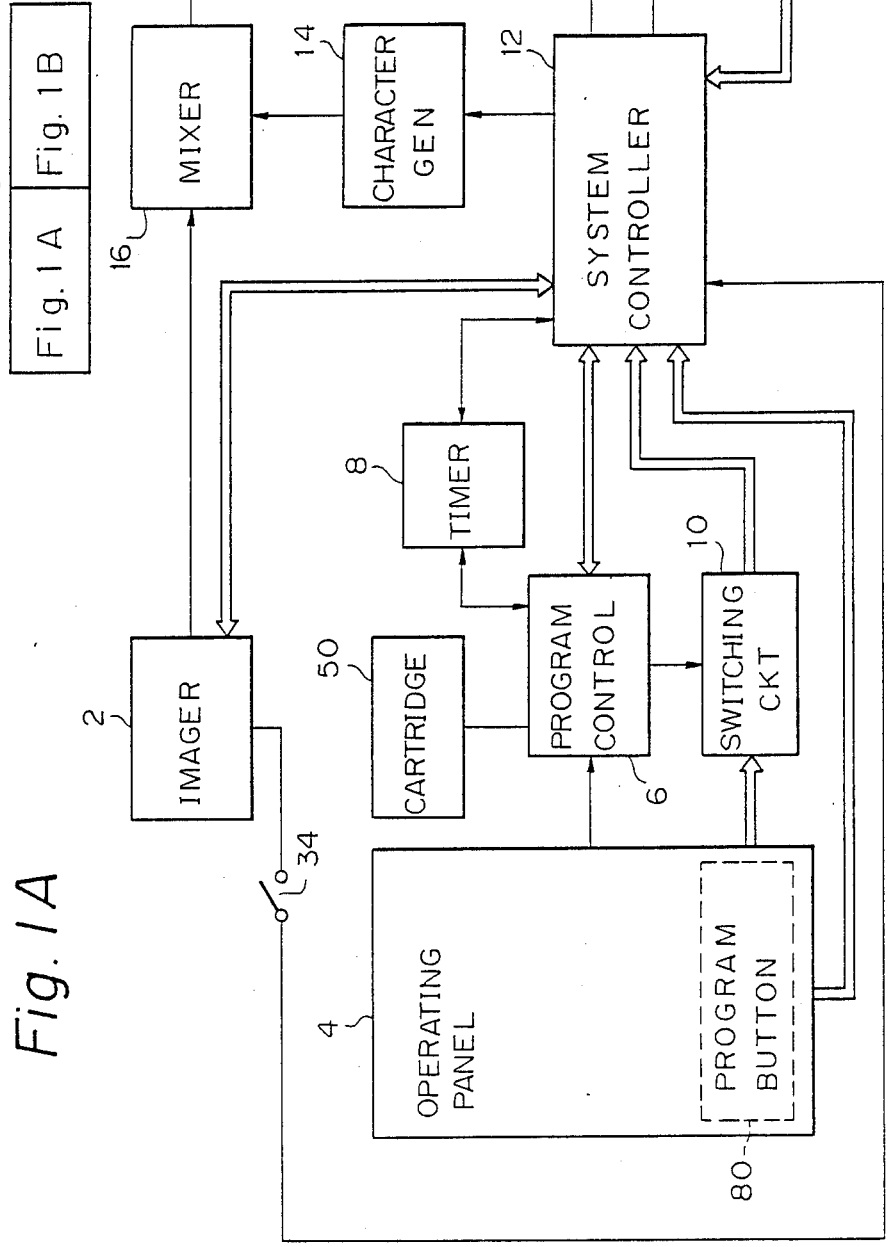

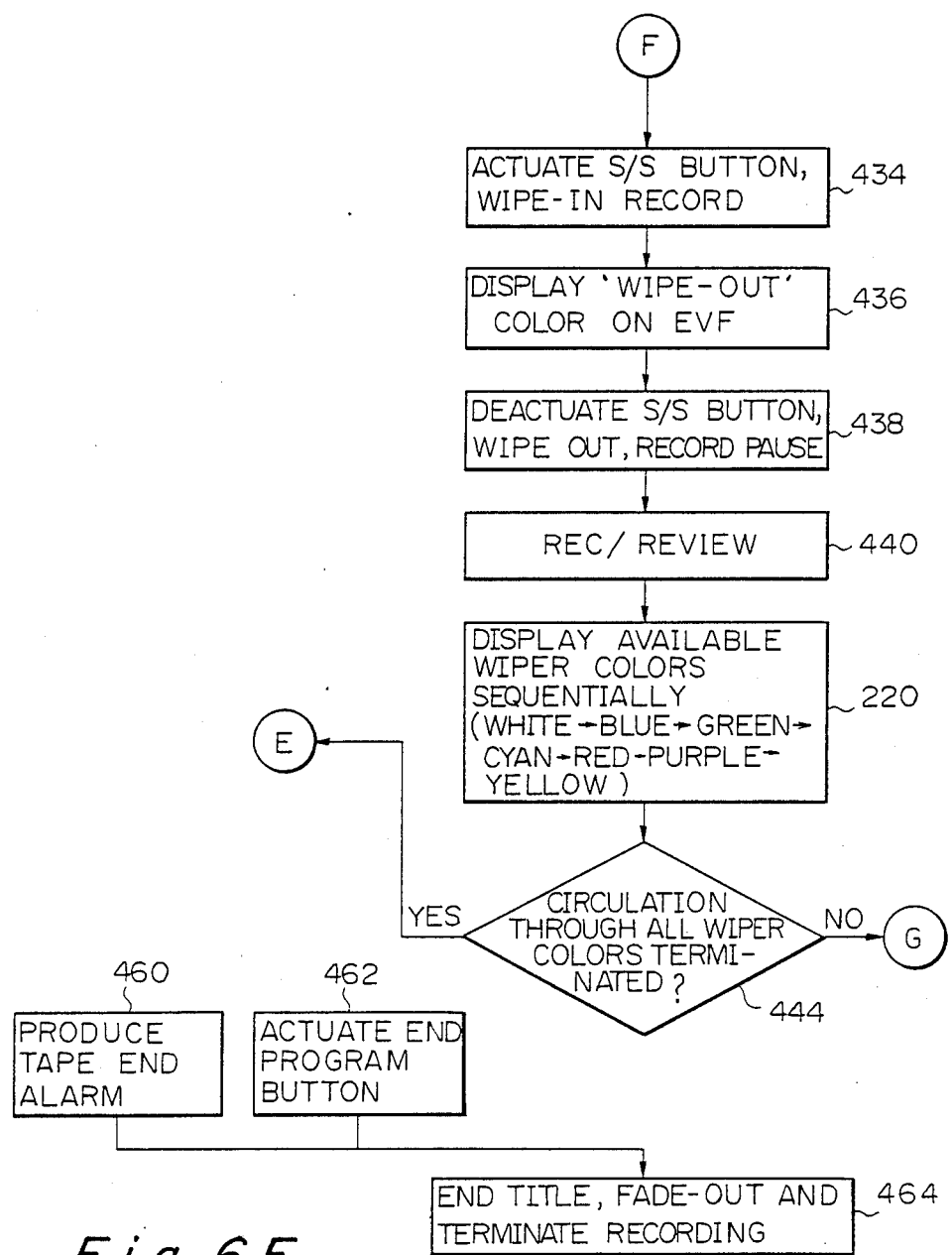

4,858,012

CAMERA HAVING AUTOMATICALLY CONTROLLABLE SHOOTING FEATURES

BACKGROUND OF THE INVENTION

1. Field of the Invention

The present invention relates to a camera and more particularly to a camera having automatically controllable shooting features, such as fading or wiping.

2. Description of the Prior Art

With accelerated progress in the electronic industry, the camera, especially the video camera, is drastically improved in performance and endowed with an increasing number of functions or features, while simultaneously its size and weight are decreased. This tendency is welcome to advanced users since a number of features such as inserting, titling, dating, fading or wiping are provided to one unit and hence he or she may produce an excellent work by making the full use of these various functions.

On the other hand, such increase in the number the features or functions results in the increased number of operating switches necessary to realize these features. Recently, several different features tend to be incorporated into one button for simplicity which in turn complicates the button manipulation. Although the camera manufacturers are trying to design the operating buttons so as to be easier to operate ergonomically, it is still necessary to provide buttons indispensable for shooting, such as those for selecting title or wiping colors, for example. Beginners may be bothered with these operating buttons and the operating panel with indication of unfamiliar video terminology so that they may refrain from even touching the operating buttons. In addition, a lot of time is required for the operator to acquire the knowledge about the operation of the operating buttons, while he is unable to exploit the features even after he has acquired such knowledge so that a failure in shooting may be frequently caused due to mistaken operation.

Thus the beginner is unable to exploit the features provided in the video camera he has purchased. On the other hand, when the features are automated fully, not only the advanced users but also the beginners who have acquired certain skill in operation will feel unsatisfied with fully automated camera features.

It can be seen from the above discussion that, although the art of the video camera has advanced rapidly, it has not been possible to provide a camera with satisfactory operational criteria that can be used by users with widely different levels in skill ranging from beginners to highly advanced users.

SUMMARY OF THE INVENTION

It is therefore an object of the present invention to provide a camera by which optimum shooting can be performed depending on the different shooting skill of the users.

It is another object of the present invention to provide a camera by which optimum shooting can be performed by the exploitation of the various features incorporated in the camera and without regard to the difference in the shooting skills of the users.

In accordance with the present invention, there is provided a camera comprising: imaging means for picking up an image of an object field, said imaging means having a plurality of shooting features for achieving shooting of the image; operating means including manual operating member for entering a shooting instruction by said manual operating member; control means responsive to the shooting instruction from said operating means for controlling said imaging means to cause said imaging means to accomplish the plurality of shooting features; and connecting means for connecting memory means to said control means, said memory means storing therein feature setting information adapted for selectively activating the plurality of shooting features; said control means being responsive to the shooting instruction from said operating means to read out the feature setting information from said memory means to control said imaging means in accordance with the feature setting information to cause said imaging means to accomplish the plurality of shooting features in accordance with the feature setting information.

Further, in accordance with the invention, a camera comprises: imaging means for picking up an image of an object field, said imaging means having a plurality of shooting features for achieving shooting of the image; operating means including a first manual operating member for entering a shooting instruction by said first manual operating member; selecting means for entering a selecting instruction associated with the plurality of shooting features; control means responsive to the instructions from said operating means and said selecting means for controlling said imaging means to cause said imaging means to accomplish the plurality of shooting features; and connecting means for connecting memory means to said control means, said memory means storing therein feature setting information for selectively activating the plurality of shooting features under a prescribed sequence and condition; said control means being responsive to the shooting instruction from said operating means to read out said feature setting information from said memory means to control said imaging means in accordance with the feature setting information to cause said imaging means to accomplish the plurality of shooting features in accordance with the feature setting information, said control means causing, when the selecting instruction is entered from said selecting means, said imaging means to preferentially accomplish any of the plurality of shooting features associated with the selecting instruction.

BRIEF DESCRIPTION OF THE DRAWINGS

The objects and features of the present invention will become more apparent from the consideration of the following detailed description taken in conjunction with the accompanying drawings in which:

FIGS. 1A and 1B, when combined as shown in FIG. 1, are a schematic block diagram showing an embodiment of the camera having automatically controllable shooting features according to the present invention;

FIGS. 6A to 6E are flow charts useful for understanding the typical operation of the embodiment shown in FIGS. 5A and 5B.

DESCRIPTION OF THE PREFERRED EMBODIMENTS

Figure 4:
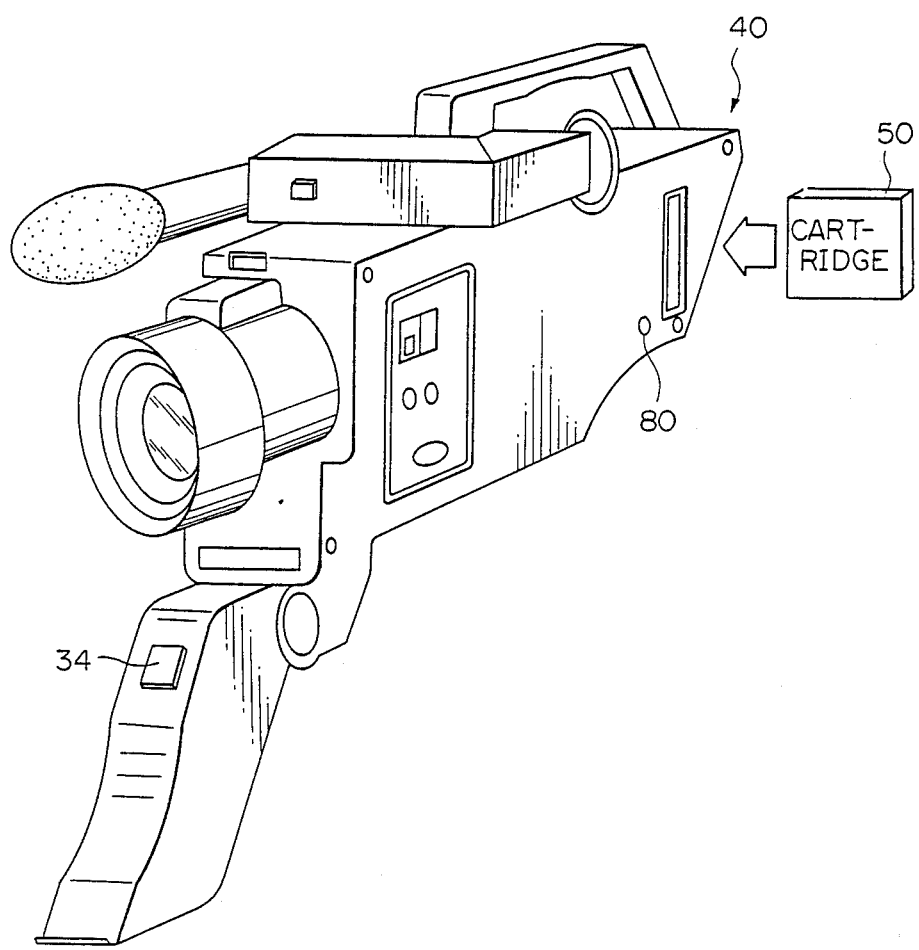
FIG. 4 is a perspective view showing the appearance of the camera shown in FIGS. 1A and 1B.

Referring to FIG. 4, there is shown a video camera 40 including a built-in recorder and a ROM or gate array cartridge 50 containing a stored program for controlling the features of the camera 40 concerning shooting, according to the present invention. The cartridge 50 may be mounted permanently or detachably as desired. On actuation of a program button 80, the control program is read from the cartridge 50 to control the features provided to the camera 40 in accordance with the control program. When the cartridge 50 is not in circuit, or when the cartridge 50 is in circuit but when the program button is not actuated, the features of the camera 40 can be performed only in response to manual operation.

Figure 1B:
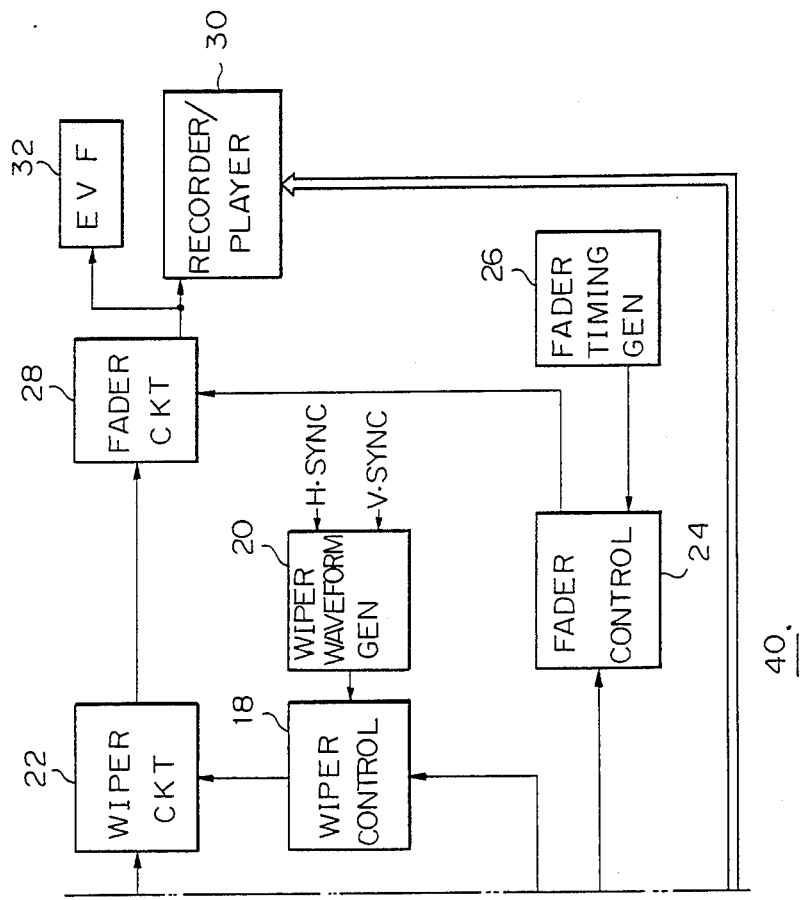

Referring to FIGS. 1A and 1B, the camera 40 has an imager section 2. The section 2 includes an optical lens system, a solid-state imaging device, such as a CCD, an automatic focussing system and an automatic white balance adjustment system, not shown. In accordance with the instructions from a system controller 12, the imager 2 adjusts the light volume or focus of an object field and converts an optical image of the viewed field formed through the lens system into video signals which are transmitted to a mixer 16.

An operating panel 4 is provided on the outer surface of the main body of the camera 40 and includes, in addition to the aforementioned program switch 80, buttons or switches, not shown, for initiating the various features of the camera 40, such as an automatic focus designating switch, an automatic outdoor/indoor white balance selector switch, a fader button, a wiper button or a time/date setting button. The operation of actuating those switches or buttons is necessarily performed by the manual operation of the user. The program switch 80 is a switch adapted for instructing shooting features programmed in the cartridge 50.

The camera 40 also includes a program control 6 including in turn a connector for connection to the cartridge 50 and a reader unit for the cartridge 50, both not being shown. On insertion of, for example, the detachable cartridge 50 and actuation by user of the aforementioned program switch 80, the control 6 reads out the control program stored in the cartridge 50 under the control of the system controller 12 to transmit the readout information to the system controller 12. The control 6 also controls a timer 8 to control the timing of turning on and off of a switching circuit 10. The timer 8 is connected to the program control 6 and the system controller 12 and, in accordance with the instructions of the control 6, controls the timing for turning on and off of the switching circuit 10 and a switch 34.

The switching circuit 10 responds to manual actuation of the operating buttons or switches of the operating panel 4 to effect switching of the relevant circuits for connection thereof to the system controller 12. The switching circuit 10 effects switching of the inner circuit thereof under the instructions from the program control 6, this switching being made in preference to switching of the internal circuits by the operation of the operating section 4.

The system controller 12, which includes a microcomputer in the present embodiment, operates to receive signals from various parts of the camera including the imager section 2, switching circuit 10 and a recorder 30, to evaluate the received signals and to transmit control signals whenever the necessity arises.

The camera 40 also includes a character generator 14 which under the control of the system controller 12, generates a string of characters or letters including the date at the start of the program operation as later described, a fixed title and a fixed end title at the time of tape end alarm, which string of characters are transmitted the mixer 16. The mixer operates to superimpose signals indicative of the character string transmitted from the character generator 14 on the video signals transmitted from the imaging section 2 to transmit the resulting composite signals to a wiper circuit 22.

A wiper control 18 connected to the wiper circuit 22 is operated under the control of the system controller 12 to control a wiper waveform generator 20 and the wiper 22. The wiper waveform generator 20 generates wiper waveforms in synchronism with vertical sync signals. (V. SYNC) and horizontal sync signals (H. SYNC) in response to instructions from the wiper control 18. As the wiping color, various colors such as white, blue, green, cyan, red, purple or yellow are provided in the wiper circuit 20. In response to instructions of the wiper control 18, the wiper 22 effects wiping of the video signals transmitted from the mixer 16 and transmits the resulting signals to a fader circuit 28.

Under the control of the system controller 12, a fader control 24 controls the fader circuit 28 at the timings defined by a fader timing generator 26. The fader timing circuit 26 effects timing adjustment of fade-in and fadeout in accordance with instructions of the fader control 24. The fader circuit 28 effects fading of the video signals transmitted from the wiper circuit 22 to transmit the resulting signals to an electronic view finder (EVF) while also transmitting these signals to the recorder/player 30 under the control of the system controller 12.

The recorder/player 30 operates to record video signals transmitted from the fader circuit 28 on a video tape, under record instructions from the system controller 12, while also operating to sense the recorded video signals under reproducing instructions from the section 12 to transmit the reproduced signals to the EVF 32. The EVF includes a small sized CRT and operates to receive the video signals transmitted from the fader circuit 28 or from the recorder/player 30 to visualize the image represented by these signals.

The aforementioned switch 34 is provided as shown on a control line from the system controller 12 to the imager 2. The switch 34 is a start/stop button, hereafter referred to as S/S button, adapted for instructing record start or stop to the system controller 12. As shown in FIG. 4, it is disposed on a grip of the camera 40 and manually operated by the user.

The cartridge 50 is loaded with a memory, such as a PROM, in which there is stored a program for controlling the shooting features of the camera 40 in a predetermined order and under the prescribed shooting sequence or conditions as later described. In case the memory is a ROM, the program stored therein is decoded by the system controller 12 which then produces operating pulses used for actuating or reading the state of various parts of the camera. It is also possible to use a cartridge loaded with a pulse generator such as gate array instead of the memory such as a ROM. In case the cartridge 50 is loaded with a gate array, the system controller 12 produces operating pulses at the timing prescribed by the setting contents of the gate array to control various camera parts. In the memory of the cartridge 50, there are also stored fixed data and a program for inserting into a picture a fixed title that may be generally used in any video products, such as "VIDEO LIFE" or end titles such as "END".

Figure 2A:
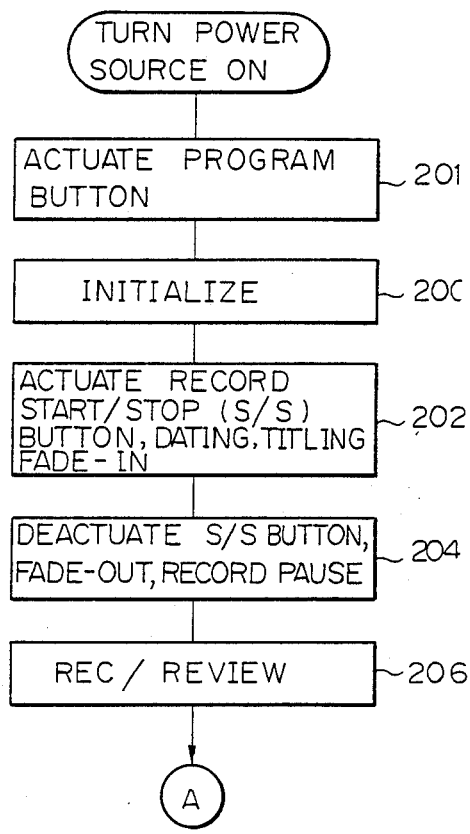
FIGS. 2A, 2B, 2C and 3 are flow charts useful for understanding the typical operation of the embodiment shown in FIGS. 1A and 1B.
Figures 2B, 2C:
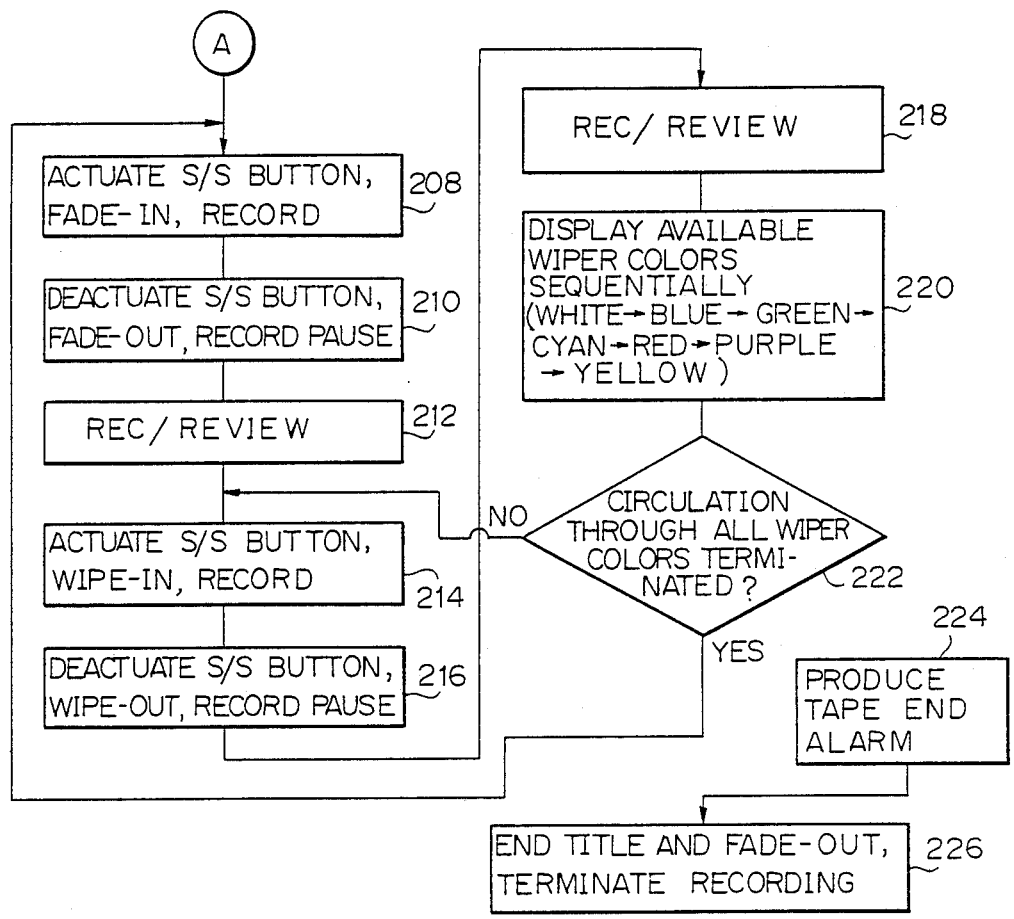

Referring to flow charts of FIGS. 2A, 2B and 2C, the operation of the camera 40 is discussed in more detail. Supposing that a beginner unaccustomed to camera operation tries to shoot an object field with the use of the cartridge 50, such cartridge 50 is employed in which there is stored a program designed for automatically accomplishing the various features provided to the camera 40, herein a sequence of instructions programmed in accordance with the control flow chart as shown in FIGS. 2A, 2B and 2C.

The power source of the camera 40 is first turned on to enable the various features of the camera 40. As the cartridge 50 is connected to the program control 6 and the program switch or button 80 of the operating console 4 is actuated by the user at step 201, the system control 12 reads out the program stored in the cartridge 50 through the program control 6 to initialize the various parts of the camera at step 200. This means that the operation instructed by the program should be performed preferentially. Thus, with the switch 80 turned on, the various feature or function switches of the operating panel 4 for manual operation are invalidated, such that the switching circuit 10 is not activated even upon manual contact of the operating buttons except the shooting button or S/S button, with the system control 12 not being responsive to such button actuation.

In the initializing step 200, the camera 40 is set to a camera mode, while the white balance, focus and iris are all set to an automatic mode.

On actuation of the S/S button by the user, the switch 34 is set to the closed state. With the switch 34 thus closed, the system controller 12 decodes the program for a fixed title stored in the cartridge 50, through the program control 6, while actuating the character generator 14 to generate the string of letters or characters for the fixed title. The thus produced string of characters for the fixed title and the date are superimposed in the mixer 16 on the video signals transmitted from the shooting section 2 for about ten seconds in the present embodiment. The controller 12 also controls the fader control 24 to actuate the fader timing circuit 26 and the fader circuit 28. The control 12 acutates the recorder/player 30 whereby the aforementioned fixed titled and the date are inserted while the video signals in which fading has been carried out are also recorded on the video tape. In this manner, on actuation of the S/S button by the user, the recorder/player 30 records the fixed title and the date for about ten seconds, while also recording the image and the sound with fade-in at step 202.

Thus when the S/S button is actuated to turn off the switch 34, the system controller 12 controls the fader control 24 to actuate the fader timing circuit 26 and the fader circuit 28 to fade out the image and the sound while temporarily stopping or halting the recording by the recorder/player 30 at step 204 (paused state). With the recording thus set to the paused state, the controller 12 controls the timer 8 and the recorder/player 30 to rewind the last recorded, several-second interval of the tape to reproduce the last portion of the previously recorded scene to visualize the portion on EVF 32 at step 206. This operation is hereafter referred to as the rec/review. After termination of the rec/review operation, the record paused state is set, with the camera being readied for starting the next recording operation.

When the S/S button is actuated to turn off the switch 34, the operations similar to those at the steps 202 and 204 are performed. Thus the image and the sound are faded out and the record paused state is set at step 210, after which the rec/review operation is performed at step 212. The record paused state is again set after termination of the rec/review operation.

It is now assumed that, in the record paused state following the end of the rec/review operation, the S/S button is actuated to turn on the switch 34. The system controller 12 then releases the recording paused state while controlling the wiper control 18 to actuate the wipe wave generator 20 and the wiper circuit 22 to perform the recording with wipe-in of the image and the sound at step 214.

When the S/S button is actuated to turn off the switch 34, the image and the sound are wiped out and the record paused state is set at step 216. The rec/review operation similar to that at step 206 is performed at step 218. After the termination of the rec/review operation, the recording paused state is again set.

The system controller 12 then controls the wiper control 18 to actuate the wiper waveform generator 20 to change the wiping color for wipe-in and wipe-out at step 220. In the present program, a particular sequence is set in which the colors are changed is set and the color is changed to the next color on termination of the wipe-in and wipe-out of a given scene. At step 222, it is determined whether circulation through the wiper colors provided in the camera 40 has been completed. If the circulation has been completed, the program returns to step 208 and, otherwise, the program returns to step 214.

When the residual amount of the video cassette tape is decreased during execution of the program operation and exceeds a preset limit, the system controller 12 causes the tape end alarm to be displayed on the electronic view finder 32 at step 224. Simultaneously, the character generator 14 and the program control 6 are actuated to introduce the fixed end title that may be used generally to any video work, such as "END", into the video signals, by the operation similar to that performed for indication of the start title as described above. The resultant video signals are recorded at the recorder/player 30 to fade out both the image and the sound to complete the recording at step 226.

Although not shown in the flow charts of FIGS. 2A, 2B and 2C, the system controller 12 always watches timing of operations on the basis of the timing information of the timer circuit 8. Thus, at the time of actuation of the S/S button at step 208, the system controller 12 controls the various parts in such a manner that, when the time interval since the turning off at step 204 until turning on at step 208 is less than about three minutes, the recording is performed without fade-in at step 208.

Figure 3:
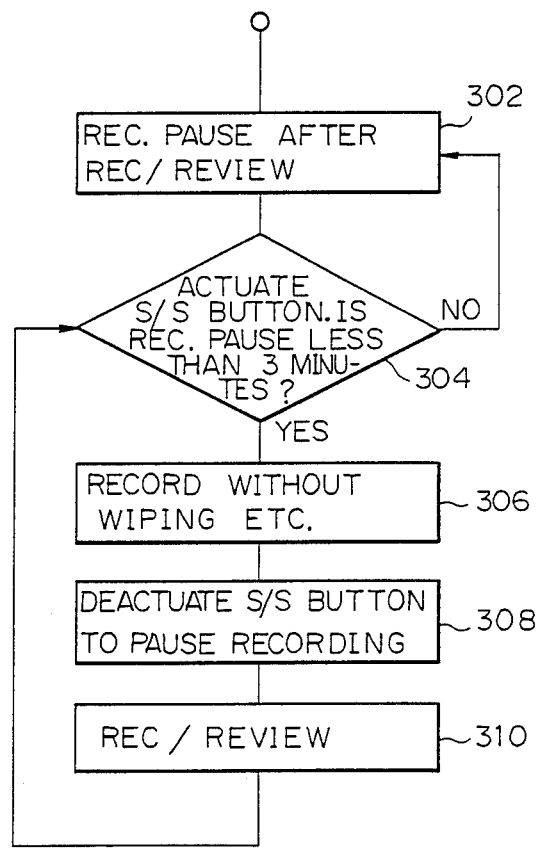

This operation is shown in the flow chart of FIG. 3. After the termination at step 302 of the rec/review operation and of the recording paused state, the system controller 12 determines at step 304 whether the turning on of the switch 34 by the operation of the S/S button has been made within about three minutes. If more than about three minutes have elapsed until the time of such operation, the program proceeds to step 302. If the time elapsed is not more than three minutes, recording is performed without wipe-in at step 306 and the switch 34 is turned off by the operation of the S/S button at step 308 to perform the rec/review operation at step 310. The program then transfers to step 304. This is because the effect of wipe-in or fade-in on the viewer of the reproduced image is rather poor and occasionally detracts from the impression of the video product if the wipe-in or fade-in is performed in case the record stop time duration is shorter. This operation is also performed at step 214 of FIG. 2B.

In accordance with the present embodiment, described above, there is stored in the cartridge 50 connected to the camera 40 a program which is so set that the features provided to the camera 40 may be accomplished automatically in accordance with a predetermined sequence, the system controller 12 reads the program stored in the cartridge 50 to control the various features or functions of the camera 40 in accordance with the stored program. Thus the operator may perform shooting without being bothered by complexity in operating buttons. Also, since the scenes employing the functions of the camera 40 may be automatically incorporated into the work by shooting, the operator may understand the meaning of these functions more easily. In addition, since the program proceeds at the timing of actuating of the S/S button, the operator may grasp at which time these functions are applied.

Figure 5A:
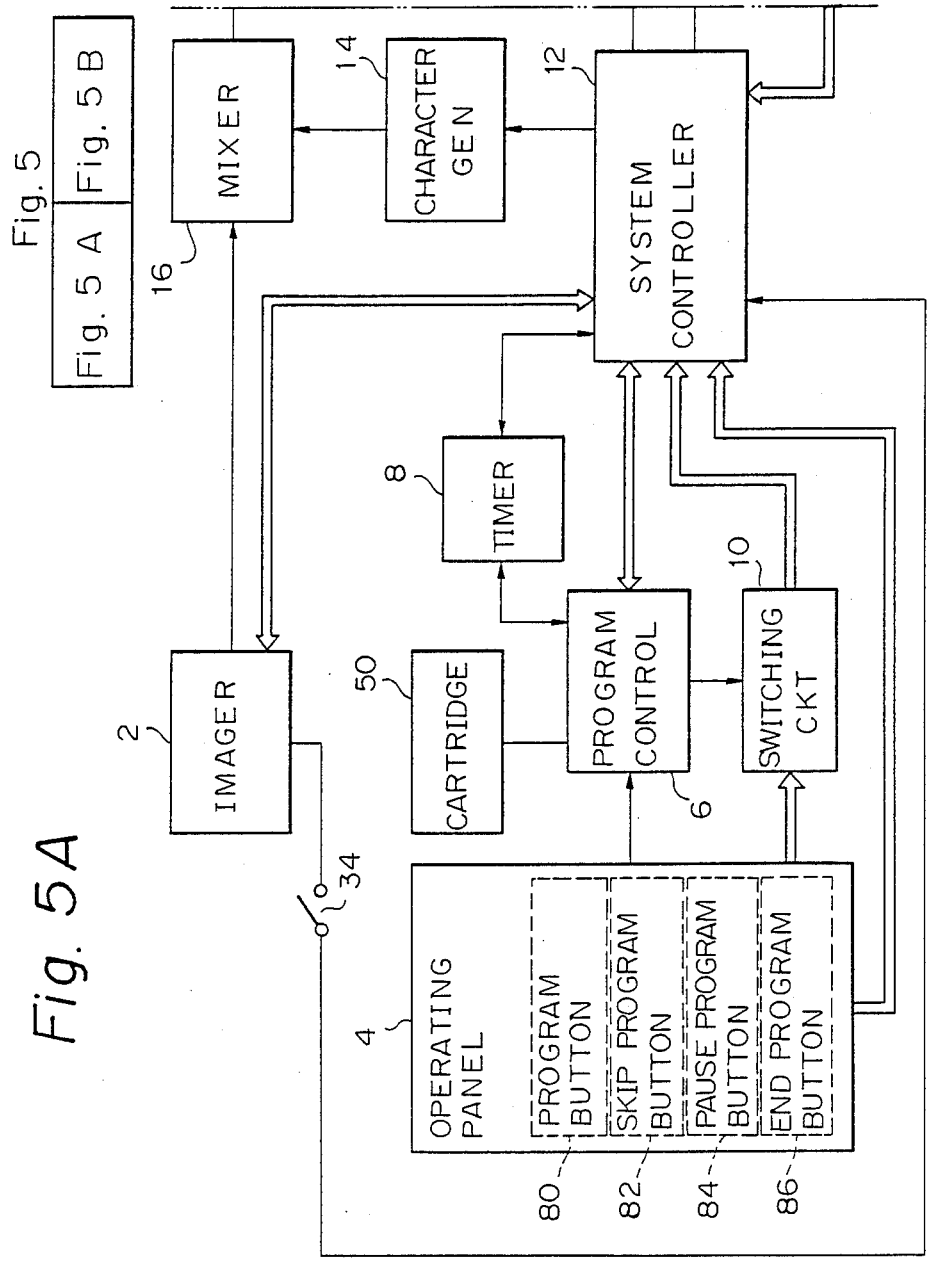
FIGS. 5A and 5B, when combined as shown in FIG. 5, are a schematic block diagram, similar to FIG. 1, showing an alternative embodiment of the present invention.
Figure 5B:
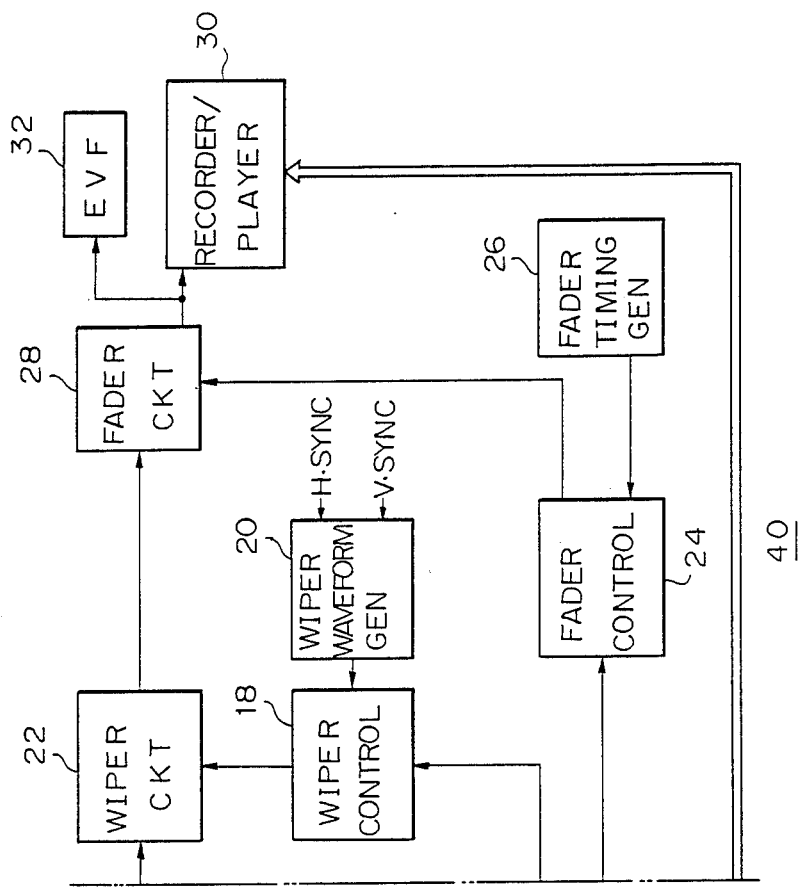
Figure 6A:
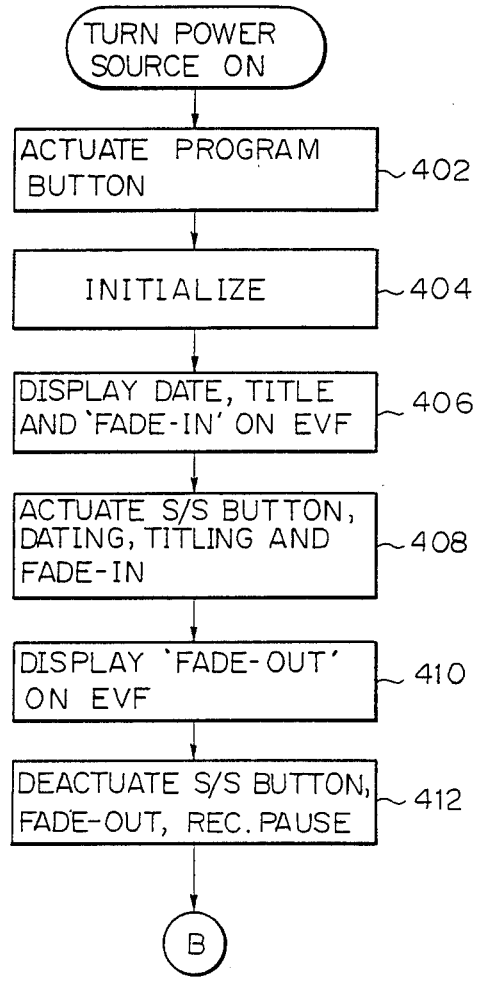
Figure 6B:
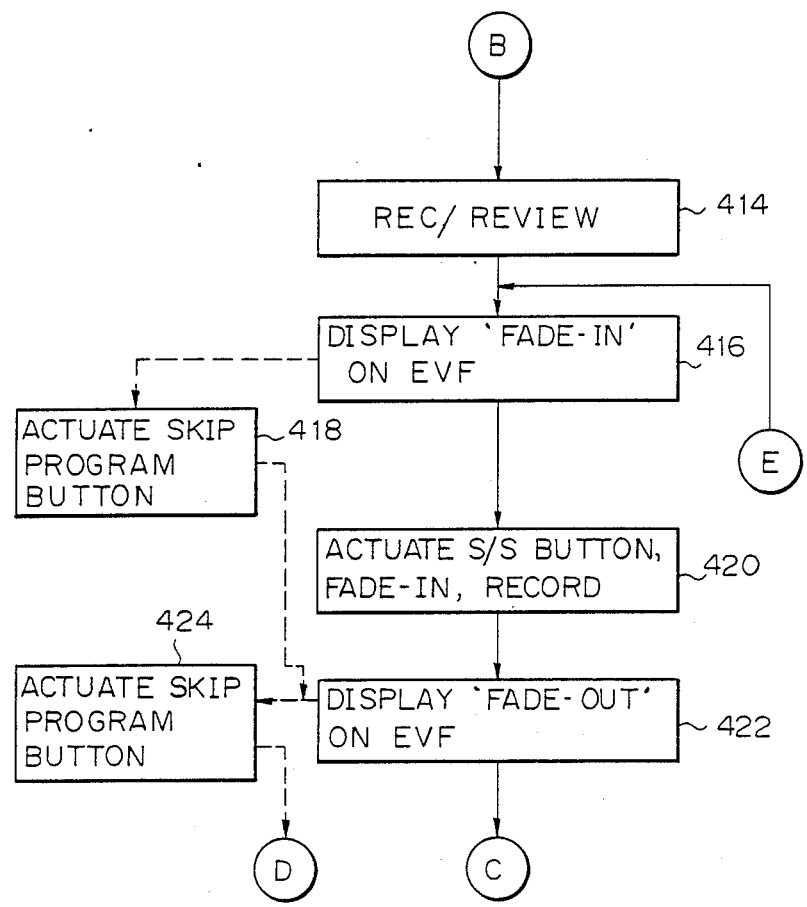
Figure 6C:
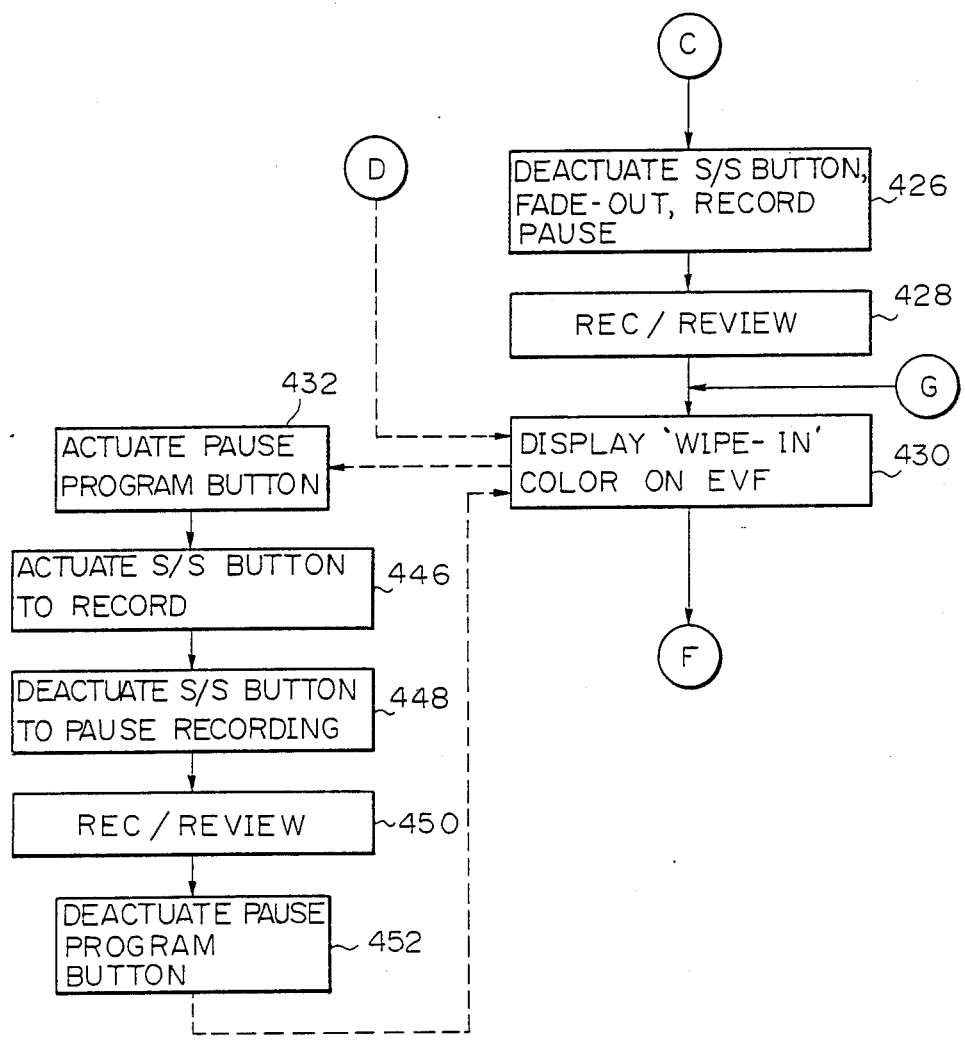

Turning to FIGS. 5A and 5B illustrating an alternative embodiment of the present invention, there are provided to the operating panel 4 a number of operating buttons or switches, such as a skip program button 82 for controlling the program during program starting, pause program button 84 or an end program button 86, in addition to the program button or program control switch 80. In FIGS. 5A and 5B et seq, the elements like those of the embodiment shown in FIG. 1 are denoted by the same reference numerals. When the respective switches are turned on, these switches are connected to the associated program control 6, switching circuit 10 and to the system controller 12.

Figure 7:
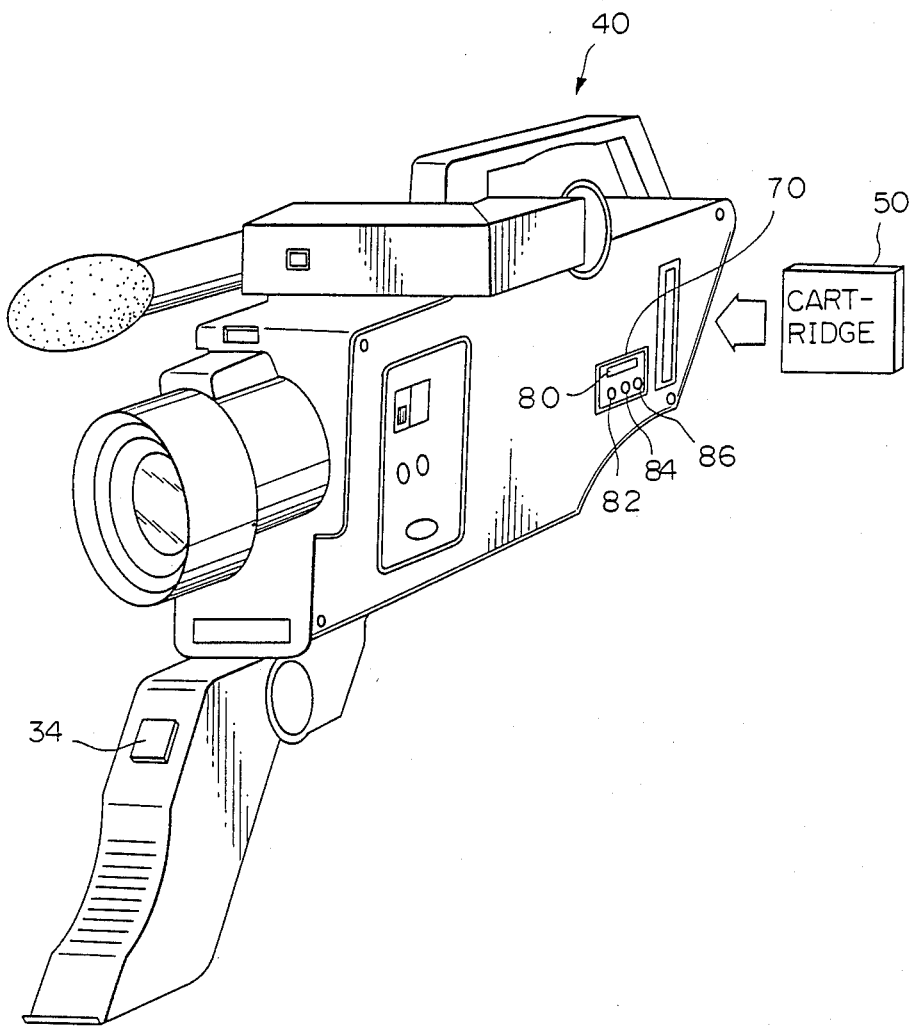
FIG. 7 is a perspective view showing the appearance of the camera shown in FIGS. 5A and 5B.

The skip program button 82, end program button 86 and the pause program button 84 of the operating console 4 are disposed provided on a program operating panel 70 provided on the lateral side of the camera 40, as shown in FIG. 7. The operation of the buttons 86 and 84 becomes effective when the cartridge 50 including a stored program for controlling the function of the camera 40 is inserted into or connected to the camera 40 and the program button 80 is actuated by the operator. In the present embodiment, there are stored in the cartridge 50 the control program for controlling the various features of the camera 40 and the program for selecting in the video signals several kinds of fixed titles that may be used in any video works, such as "A HOLIDAY LIFE" or fixed end titles such as "END".

The skip program button 82 has the feature of canceling the next operation during program starting and skipping a program step, and the feature of selecting a title at the time of fixed title insertion. The pause program button 84 is designed to stop the program running for a time and to reserve the next operation. The program may be restarted on re-actuation of the button 84. The end program button 86 is used for inserting the end title at the end of the work. When the button 86 is actuated during recording, the end title is inserted at the timing of the record pause with the recording faded out.

In the present embodiment, the system control 12 produce a string of characters under the control of the system control 12 to transmit the produced character string to the mixer 16. As the wiping colors for the wiping operation, the colors such as white, blue, green, cyan, red, purple or yellow, are provided in the wiper 22 so as to be selected in response to instructions of the wiper control section 18. According to the illustrative embodiment, the EVF 32 further displays a string of characters or letters indicating the progress of the program generated in the character generator 14 under the control of the system controller 12.

There is also stored in the memory of the cartridge 50 a program adapted for selectively inserting several kinds of titles into the picture. On actuation of the skip program button 82 of the operating section 4, the program of the title associated with the operation is read into the system controller 12. It is not the title itself but a sequence of instructions for sequentially selectively designating the title setting, characters or colors what is stored in the ROM. The system controller 12 produces control pulses associated with these instructions to realize the functions or features for setting the conditions for titling. This may therefore be achieved by the use of the gate arrays.

Turning now to the flow chart of FIGS. 6A to 6E, the operation of the camera 40 is described in more detail. More specifically, the case in which an object field is shot by using the cartridge 50 in which there is stored a program so designed that the features provided to the camera 40 as shown for example in FIGS. 6A to 6E may be realized automatically is hereafter explained.

The various features of the camera 40 are enabled on connecting the power source of the camera 40. When the cartridge 50 is connected to the program control 6, and the program switch or button 80 on the program operating panel 70, FIG. 7, for designating the preference of the programmed operation is enabled by the operator at step 402, the system control 12 reads out the program stored in the cartridge 50 through the program control 6 to perform an initializing operation at step 404. The program switch 80 thus depressed makes ineffective the various feature switches or operating buttons adapted for manual operation of the operating section 4, such that, even when the operating buttons other than the shooting switch or S/S button 34 are contacted manually, the switching circuit 10 is not enabled, while the system controller 12 is not responsive to such button actuation.

At the initializing step 404, the camera 40 is set to the camera mode, while the white balance adjustment or focus or iris control are all set to the automatic mode.

After initializing, the date, fixed title and the letters "FADE-IN", which implies the next operation to be performed on actuation of the S/S button 34, are displayed on the electronic view finder 32, at step 406. Instead of letter display, an indicator corresponding thereto may be adapted to be illuminated, if so desired. The system control 12 reads out the program list for fixed titles stored in the ROM cartridge 50 for sequentially displaying plural kinds of fixed titles one by one on the EVF 32. The operator then operates the skip program button 82 on the operating panel 70 to select the fixed titles.

On actuation by the operator of the S/S button, the switch 34 is turned on. With the switch 34 thus turned on, the system control 12 decodes the program for fixed titles stored in the cartridge 50 through the program control 6 in connection with the fixed title selected at step 406 to actuate the character generator 14 and the mixer 16 to produce the fixed titles. The signals indicating the date and the string of characters of the fixed titles are superimposed onto the video signals, transmitted from the shooting section 2, for about ten seconds in the illustrative embodiment. The system control 12 also enables the fader control 24 and the recorder/player 30 to insert the fixed title and the date as described above and to perform recording with the fader operation. Thus, on actuation by the user of the S/S button 34, the recorder/player 30 records the fixed title and the date for about ten seconds while further making the recording with the image and the sound faded in.

When the recording is started in this manner, the system controller 12 controls the character generator 14 and the control 16 to generate the string of characters of "FADE-OUT" indicating the next operation while displaying the string on the electronic view finder 32 at step 410.

On actuation of the S/S button and the consequent turning off of the switch 34, the system control 12 controls the fader control 24 to fade out the image and the sound to stop the recording by the recorder/player 30 temporarily at step 412. After the recording is set to the paused state, the timer 8 and the recorder/player 30 is controlled to rewind the last several-second interval of the recorded tape portion at step 414 to reproduce the last portion of the recorded scene for visualization thereof on the electronic view finder 32 by way of performing a rec/review operation. After the termination of the rec/review operation, the camera 40 is readied for starting the next recording, with the recording pause state being set, and the letters "FADE-IN" indicating the next operation are displayed at step 416 on the electronic view finder 32 by the operation comparable to that performed at step 410. When the operator deems that the next scene is unnecessary to shoot, he may actuate the skip program button 82.

When the skip program button 82 is actuated by the operator whilst the letters "FADE-IN" are displayed on the EVF 32, the next program step 420 is skipped and the letters "FADE-OUT" are displayed on the EVF 32 at step 422. When the operator again actuates the skip program button 82 deeming the fade-out operation to be unnecessary, the program proceeds to step 430 and the letters "WIPE-IN" and a wiping color are displayed on EVF 32 at step 430. When the skip operating button 82 is not actuated, the program proceeds to step 420 at step 416. In short, when the skip program button 82 is actuated, the fade-in or fade-out operation is not performed during recording and, when the button is not actuated, the program proceeds in accordance with the program sequence with the fade-in or fade-out operation being performed.

When the operator actuates the S/S button to turn on the switch 34, in the absence of actuation of the skip program button 82, the system control 12 releases the recording paused state of the recorder/player 30 to control the fader control 24 to effect recording with fade-in of the image and the sound at step 420.

Upon starting the recording, the letters "FADE-OUT" indicating the next scheduled operation are displayed on the electronic view finder 32 by the operation comparable to that performed at step 410. When the skip program button 82 is operated by the operator whilst the letters "FADE-OUT" are displayed on the EVF 32, the program transfers at step 422 to step 430 and otherwise to step 426.

When the S/S button is actuated to turn off the switch 34, the operation similar to that at steps 412 and 414 is performed. More specifically, the image and the sound are faded out and the recording is stopped transiently at step 426. After the recording paused state is set, the rec/review operation is performed at step 428. After the termination of the rec/review operation, the recording paused state is again set. In the course of the recording paused state, the letters "WIPE-IN" indicating the next operation and a wiping color are displayed at step 430 on the electronic view finder 32 by the operation similar to that at step 410.

When the pause program button 84 of the operating section 4 is actuated at step 432 by the operator whilst the letters "WIPE-IN" and a wiping color are displayed, the program proceeds to step 446 and otherwise to step 434.

When the pause program button 84 is actuated, the system controller 12 responds to the turning on or off of the switch 34 brought about by the actuation by the operator of the S/S button to control the recorder/player 30 to effect the start of recording or the recording pause operation with omission of the fade-in or wiping operation at steps 446 and 448. The controller then performs the rec/review operation similar to that at step 414. In the recording paused state following the end of the rec/review operation, the pause program button 84 is actuated by the operator at step 452 to return to step 430.

When the S/S button is actuated in the recording paused state following the end of the rec/review operation, in the absence of the actuation of the pause program button to turn on the switch 34, the system control 12 releases the recording paused state of the recorder/player 30 to control the wiper control 18 to effect recording at step 434, with the image and sound wiped in with that wiping color which was displayed at step 430.

When the recording with the wipe-in is started, the letters "WIPE-OUT" indicating the next operation and a wiping color are displayed on the electronic view finder 32 at step 436 by the operation comparable to that performed at step 406.

When the S/S button is actuated to turn off the switch 34, the system controller 12 controls the wiper control 18 with the image and sound wiped out with that wiping color which was indicated at step 436 to set the recording paused state at step 438. After the recording is set to the paused state, the rec/review operation similar to that at step 414 is performed at step 440, followed by the recording paused state.

The system controller 12 then controls the wiper control 18 to change the wiping color provided in the wiper 22 to the next color at step 442. The wiping colors are used repeatedly in the sequence of, for example, white, blue, green, cyan, red, purple and yellow, prepared in the wiper 22. In the present program, the color is changed to the next color upon the termination of the wipe-in and wipe-out for one scene. It is determined at step 444 whether circulation through the wiping colors provided in the wiper 22 is completed. If it is determined that such circulation has been completed, the program returns to step 416 and, otherwise, the program returns to step 430.

Although not shown in the flow charts of FIGS. 6A to 6E, the system controller 12 monitors the timing in accordance with the timing information of the timer generator 8. Thus, when the S/S button 34 is turned on at step 420, the control operation by the section 12 is performed in such a manner that, unless any of the skip program button 82, pause program button 84 and the end program button 86 is actuated, the recording is performed at step 420 when the interval that elapses since the turning off at step 412 until the turning on at step 420 is not more than about three minutes. The operation is similar to that of the first embodiment already described with reference to the flow chart of FIG. 3.

When the shooting is continued in this manner, and when it should become desirable to terminate the shooting of a continuous story before the tape end, the end program button 86 may be actuated to terminate the recording with fade-out with the end title being mixed into the image. The recording may naturally be terminated similarly at the tape end. The above operation is now described by referring to the flow chart. As the residual amount of the video cassette tape is decreased with the progress of the programmed operation to reach the preset limit value, the system controller 12 causes the tape end alarm to be displayed on the electronic view finder 32 at step 460. When the end program button 86 is actuated by the operator at step 462, the system controller 12 actuates the program control 6, character generator 14 and the mixer 16 to cause the signals indicating fixed end titles usable in any video works, such as "END", to be mixed into the video signals by the operation similar to that for the start title. The controller 12 then records the mixed signals by means of the recorder/player 30 to terminate the recording with fade-out of the image and the sound at step 464. In the absence of actuation of the end program button 86, the operation is performed in accordance with the preset flow so that the shooting is continued with the operation being selectively switched between recording pause, fading and wiping by the actuation of the associated buttons by the user. When the recordable tape area is depleted, a tape end alarm is displayed on the electronic view finder 32 and the above described operation is performed to terminate the recording.

According to the present embodiment, as described above, when the cartridge 50 with a stored program therein which is so designed that the various features provided to the camera 40 are realized automatically is connected to the camera 40, the system controller 12 reads the program to effect the various features of the camera 40 in accordance with the program sequence, with the control state of the camera features being displayed on the electronic view finder 32. Thus the operator may perform shooting without being bothered by complex operating buttons.

Since the operating buttons for program control, viz. skip program button 82, pause program button 84 and end program button 86, are provided to the camera 40, the operator is in a position to control selectively the operation programmed by the cartridge 50 in dependence upon the state of shooting at the time of the program-controlled shooting. Therefore, the operator is in a position to grasp the meaning of the features proper to the camera 40, through the program control, while he or she may introduce his or her own original idea or concept into the program-controlled shooting.

Although the foregoing description has been made with reference to a specific program stored in the cartridge 50 for controlling the various features of the camera, any other ROM cartridge may be employed in which these shooting features are stored in any other desired form or sequence.

In the above illustrative embodiments, the ROM cartridge is used as the medium for program storage. However, any other memory media such as the floppy disk or PROM may be employed. In addition, although the outboard memory medium is used in the above illustrative embodiments, memory devices such as ROMs or pulse generators composed for example of gate arrays may be permanently incorporated within the camera 40 instead of the outboard memory media.

The camera illustrated in the above embodiments is not limited to the video camera with a built-in recorder, but may be applied to a camera separated from the recorder, an electronic still camera or to a silver-halide film type camera.

According to the present invention, the feature of connecting to memory means for feature setting information is incorporated into the camera, the shooting feature of which can be controlled, such that, when the memory means are connected to the camera, the various camera features may be automatically set to prescribed conditions to permit shooting in accordance with the feature setting information stored in the memory means. Therefore, the operator may perform shooting to make the best use of certain specific features subject only to manual actuation of the recording start/stop switch, while he is also in a position to acquire the knowledge about the features incorporated into the camera.

Also, according to the present invention, means for selecting the feature setting information which is stored in the memory means is provided to the camera, the shooting feature of which may be controlled, such that, when the memory means are connected to the camera, the various camera features may be automatically set to prescribed conditions to permit shooting in accordance with the feature setting information stored in the memory means, while he may occasionally select the feature setting conditions as the occasion may require to perform shooting. Thus the operator may perform shooting subject only to manual actuation of the recording start/stop switch and the feature setting information select button.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera comprising:
   imaging means for picking up an image of an object field, said imaging means having a plurality of shooting features for achieving shooting of the image, said imaging means including,
   an imaging device for imaging the object field to produce video signals representing the object field,
   shooting feature means for causing the video signals to be processed in accordance with the plurality of shooting features;
   operating means including a first manual operating member for entering a shooting instruction;
   selecting means for entering a selecting instruction associated with the plurality of shooting features, said selecting means including second and third manual operating members;
   control means responsive to be instructions from said operating means and said selecting means for controlling said imaging means to cause said shooting feature means to accomplish the plurality of shooting features;

said control means being responsive to actuation of said second manual operating member to cancel that one of the plurality of shooting features scheduled to follow the shooting feature being performed;

said control means being responsive to actuation of said third manual operating member to halt that one of the plurality of shooting features which is being performed until the next time said third manual operating member is actuated; and memory means for storing feature setting information for selectively activating the plurality of shooting features under a prescribed sequence and condition;

said control means being responsive to the shooting instruction from said operating means to read out said feature setting information from said memory means to control said imaging means in accordance with the feature setting information to cause said imaging means to accomplish the plurality of shooting features in accordance with the feature setting information, said control means causing, when the selecting instruction is entered from said selecting means, said imaging means to preferentially accomplish any of the plurality of shooting features associated with the selecting instruction.

2. A camera comprising:

imaging means for picking up an image of an object field, said imaging means having a plurality of shooting features for achieving shooting of the image, said imaging means including,
- an imaging device for imaging the object field to produce video signals representing the object field, and
- shooting feature means for causing the video signals to be processed in accordance with the plurality of shooting features;

operating means including a first manual operating member for entering a shooting instruction;

selecting means for entering a selecting instruction associated with the plurality of shooting features;

control means responsive to the instructions from said operating means and said selecting means for controlling said imaging means to cause said shooting feature to accomplish the plurality of shooting features; and memory means for storing feature setting information for selectively activating the plurality of shooting feature under a prescribed sequence and condition;

said control means being responsive to the shooting instruction from said operating means to read out said feature setting information from said memory means to control said imaging means in accordance with the feature setting information to cause said imaging means to accomplish the plurality of shooting features in accordance with the feature setting information, said control means causing, when the selecting instruction is entered from said selecting means, said imaging means to preferentially accomplish any of the plurality of shooting features associated with the selecting instruction;

the feature setting information including a program for setting title insertion under a prescribed condition as one of the plurality of shooting features, the prescribed condition including plural kinds of fixed titles;

said shooting feature means including a feature of the title insertion as the one shooting feature, said shooting feature means being responsive to said control means to subject the video signals to the title insertion under the prescribed condition;

said control means comprising a second manual operating member;

said control means being responsive to actuation of said second manual operating member to select the plural kinds of titles in accordance with the feature setting information.

* * * * *